United States Patent Office 3,506,693
Patented Apr. 14, 1970

3,506,693
PROCESS FOR THE PREPARATION OF OPTICALLY ACTIVE 13-ALKYL GONAPENTAENES AND INTERMEDIATES
Robert Bucourt, Clichy-sous-Bois, Michel Vignau, Neuilly-sur-Seine, and Jean Raynal, Paris, France, assignors to Roussel UCLAF, Paris, France, a corporation of France
No Drawing. Filed Aug. 21, 1967, Ser. No. 661,786
Claims priority, application France, Aug. 25, 1966, 74,179; Nov. 25, 1966, 85,043; July 7, 1967, 113,579
Int. Cl. C07c 167/02
U.S. Cl. 260—397.45                19 Claims

ABSTRACT OF THE DISCLOSURE

This invention relates to a novel process for the preparation of optically active 13-alkyl gonapentaenes of the formula

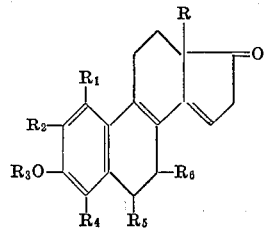

wherein R is an alkyl having from 1 to 3 carbon atoms, $R_1$, $R_2$ and $R_4$ are substituents selected from the group consisting of hydrogen, lower alkyl and lower alkoxy, $R_3$ is lower alkyl and $R_5$ and $R_6$ are substituents selected from the group consisting of hydrogen, α-lower alkyl and β-lower alkyl. This process involves condensing a 2-R-cyclopentane-1,3-dione with an acrylic derivative, resolving the 3-(1'-R-2'-ketal-5-oxo-cyclopentyl)-propionic acid by an optically active base, recovering the optically active isomers, and lactonizing the same, condensing the optically active lactone with a phenylpropyl magnesium halide and cyclizing the resultant optically active secogonatetraene to give said optically active 13-alkyl gonapentaenes. These compounds are physiologically active steroids. They are useful as starting materials for the production of active compounds belonging to the natural or to the antipodal configuration of steroids.

More particularly, the invention relates to a novel process for the preparation of the 13β-R-$\Delta^{1,3,5(10),8,14}$-gonapentaenes of the general Formula IX

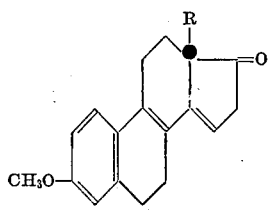

wherein R represents an alkyl radical comprising from 1 to 3 carbon atoms.

The 13β-R-$\Delta^{1,3,5(10),8,14}$-gonapentaenes of the general Formula IX, described in U.S. Patent No. 3,202,686, possess interesting hormonal effects. These compounds are estrogens acting in a favorable manner on the amount of the blood lipids.

It is a well-known fact that the object, always searched for by the steroid chemist, is to discover a process for the synthesis which although being linear and branched, has a sufficiently convergent character, whereby, on the other hand, the reaction may be stereospecific in the desired sense, and which allows a rapid resolution, preferably with the possibility of recovery of the undesired isomer. But whereas certain published syntheses up to this day respond to one or the other of these desiderata, a very small number is known to realize, these needs in a simultaneous manner.

The process of the invention offers several advantages and is distinguished, among other factors, by a very pronounced characteristic of convergence. In fact, in this process, two molecules each comprising half of the carbon skeleton of estrone are combined, the synthesis of which is completed in a limited number of steps. Moreover, the invention affords the possibility to proceed, after the first three operational steps have been accomplished, to the resolution into optically active isomers, and this is done with the recovery of the undesired isomer, a considerable advantage of the present process, by a rearrangement which restores it to a structure, wherein the substance is inactive by nature. Another advantage of the present process exists in the fact of requiring only a few stereospecific reactions, which, in addition, can be realized with satisfactory yields.

OBJECTS OF THE INVENTION

An object of the present invention is the development of a method for the stereospecific synthesis of 13β-alkyl-$\Delta^{1,3,5(10),8,14}$-gonapentaene-17-ones utilizing an early resolution into the desired optical antipodes of natural configuration.

Another object of the present invention is the development of a process for the preparation of an optically active 13-alkyl gonapentaene of the formula

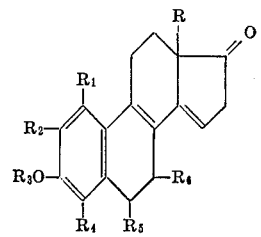

werein R is an alkyl having from 1 to 3 carbon atoms, $R_1$, $R_2$ and $R_4$ are substituents selected from the group consisting of hydrogen, lower alkyl and lower alkoxy, $R_3$ is lower alkyl and $R_5$ and $R_6$ are substituents selected from the group consisting of hydrogen, α-lower alkyl and β-lower alkyl, which comprises the steps of (a) Condensing a cyclopentane-1,3-dione of the formula

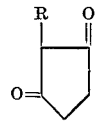

wherein R has the above-noted meanings, with a vinyl compound of the formula

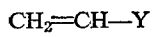

wherein Y is a substituent selected from the group consisting of —COO— lower alkyl and —C≡N, in an anhydrous alkaline medium;

(b) Ketalizing the resultant cyclopentylpropionyl compound of the formula

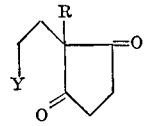

wherein R and Y have the above-noted meanings by the action of a ketalizing agent selected from the group consisting of lower alkylene glycols and dioxolanes, where the lower alkylene has from 2 to 4 carbon atoms, under ketalizing conditions, (c) Saponifying the resultant d,l-ketal of the formula

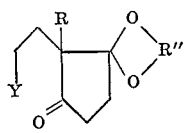

wherein R and Y have the above-noted meanings and R" represents a lower alkylene having 2 to 4 carbon atoms by the action of an aqueous alkaline medium;

(d) Resolving the resultant d,l-cyclopentyl-propionic acid of the formula

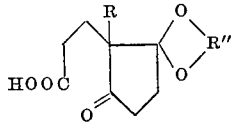

wherein R and R" have the above-noted meanings into its optical antipodes by the action of an optically active base;

(e) Lactonizing the resultant optically-active isomer of cyclopentyl-propionic acid of the formula

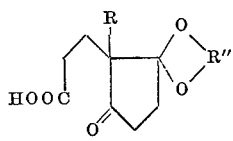

wherein R and R" have the above-noted meanings by the action of a lactonizing agent;

(f) Condensing the resultant optically active lactone of 3 - (1'-R-2'-X'-5'-hydroxy-4'-cyclopentenyl)propionic acid where R has the above-noted meanings and X' is

where R" has the above-noted meanings with a phenylpropyl magnesium halide of the formula

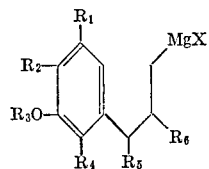

wherein $R_1$, $R_2$, $R_3$, $R_4$, $R_5$ and $R_6$ have the above-noted meanings and X represents a halide selected from the group consisting of bromide, chloride and iodide, in the presence of an ether solvent, reacting the resultant condensation product in an alkaline medium;

(g) Cyclizing the resultant optically active seco-gonatetraene of the formula

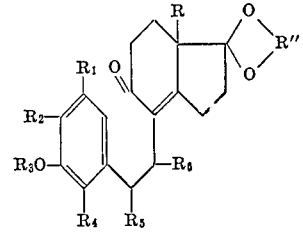

wherein R, $R_1$, $R_2$, $R_3$, $R_4$, $R_5$, $R_6$ and R" have the above-noted meanings, by the action of a strong acid dehydrating agent; and (h) Recovering said optically active 13-alkylgonapentaene.

A yet further object of the present invention is the obtention of the novel intermediates:

(a) A cyclopentylpropionyl compound of the formula

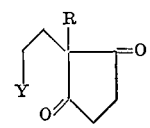

where R is an alkyl having 1 to 3 carbon atoms and Y is a substituent selected from the group consisting of

lower alkyl and —C≡N;

(b) A cyclopentylpropionyl ketal of the formula

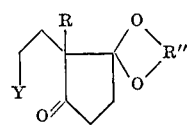

where R is an alkyl having 1 to 3 carbon atoms, Y is a substituent selected from the group consisting of

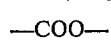

lower alkyl and —C≡N and R" is a lower alkylene having 2 to 4 carbon atoms;

(c) A cyclopentylpropionic acid of the formula

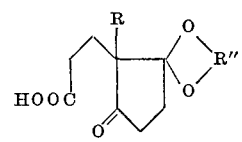

where R is an alkyl having from 1 to 3 carbon atoms and R" is a lower alkylene having 2 to 4 carbon atoms, selected from the group consisting of the racemate and the optically active isomers, and their salts with optically active bases;

(d) An optically active lactone of the formula

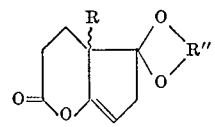

where R is an alkyl having 1 to 3 carbon atoms, R" is a lower alkylene having 2 to 4 carbon atoms and the wavy line indicates either the α-configuration or the β-configuration;

(e) An optically active seco-gonatetraene of the formula

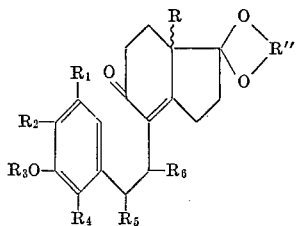

where R is an alkyl having 1 to 3 carbon atoms, R″ is a lower alkylene having 2 to 4 carbon atoms, $R_1$, $R_2$ and $R_4$ are substituents selected from the group consisting of hydrogen, lower alkyl and lower alkoxy, $R_3$ is lower alkyl, $R_5$ and $R_6$ are substituents selected from the group consisting of hydrogen, α-lower alkyl and β-lower alkyl and the wavy line indicates either the α-configuration or the β-configuration.

These and other objects of the invention will become apparent as the description thereof proceeds.

DESCRIPTION OF THE INVENTION

The process for the preparation of the optically active 13-alkyl-gonapentaenes of the general formula

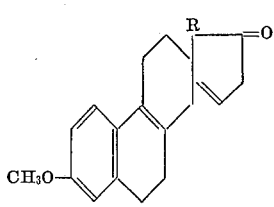

wherein R represents an alkyl radical having from 1 to 3 carbon atoms, where in the 1-, 2- and/or 4-position a lower alkoxyl radical or a lower alkyl radical can be found, where in the 6- and/or 7-position a lower alkyl radical, such as methyl, can be found in the alpha or beta configuration, where in the 3-position a lower alkoxyl radical instead of the methoxyl radical can be found, is characterized in that a 2-R-cyclopentane-1,3-dione is condensed with an alkyl acrylate, the alkyl radical having from 1 to 6 carbon atoms, by working in alkaline medium; thus obtaining the corresponding alkyl 3-(1′-R-2′,5′-dioxocyclopentyl)-propionate, which is then reacted with a ketalization agent; the resultant alkyl dl-3-(1′-R-2′-X′-5′ - oxocyclopentyl) - propionate is saponified, X′ representing the

group, wherein R″ indicates an alkylene radical having from 2 to 4 carbon atoms, substituted or unsubstituted, with the aid of an alkaline agent; the resolution of the resultant dl-3-(1′-R-2′-X′-5′-oxo-cyclopentyl) - propionic acid into its optical antipodes is conducted with the aid of an optically active base, such as D(−)-threo-(1-p.-nitrophenyl) - 2 - N,N - dimethylamino - propane - 1,3 - diol, L(+)-threo-(1-p.-nitrophenyl) - 2 - N,N-dimethylamino-propane-1,3-diol, cinchonine, yohimbine, 1 - nor-adrenaline, quinine or 1-ephedrine; the isolated optically active 3-(1′-R-2′-X′-5′-oxo-cyclopentyl)-propionic acid is subjected to the action of a lactonization agent, to obtain the corresponding optically active lactone of 3-(1′-R-2′-X′-5′-hydroxy-4′-cyclopentenyl)-propionic acid, which is then condensed with a 3-m-methoxy-phenyl-propyl magnesium halide, selected from the group consisting of the bromide, the chloride and the iodide; the condensation product is subjected to the action of an alkaline agent, thus obtaining the corresponding optically active 3-methoxy-13-R-17-X′-9,10-seco-$\Delta^{1,3,5(10),8(14)}$ - gonatetraene - 9 - one; this latter compound is subjected to the action of a cyclization agent, and the desired optically active 3-methoxy - 13 - R - $\Delta^{1,3,5(10),8(14)}$ - gonapentaene - 17 - one is isolated.

The process of the invention, relating more particularly to the preparation of the compounds of the general Formula IX is summarized in Table I, wherein the diverse substituents have the previous meanings, and wherein R′ represents an alkyl radical comprising from 1 to 6 carbon atoms.

TABLE I

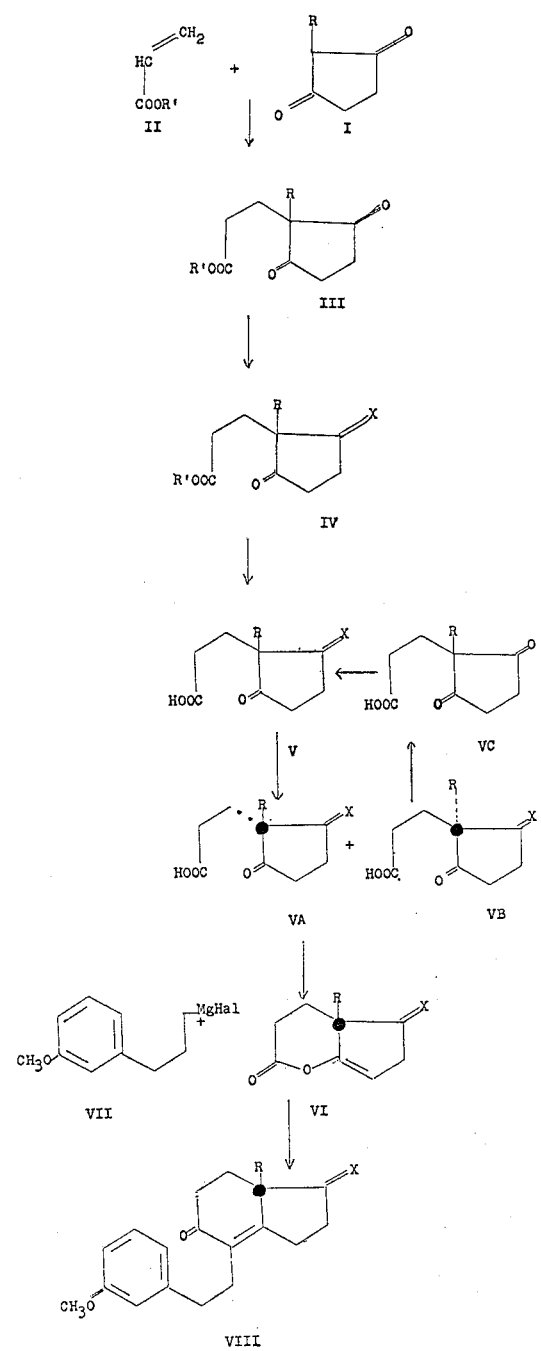

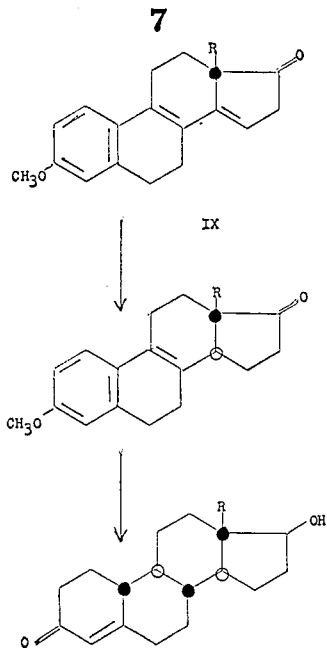

The said process is characterized in that a 2-R-cyclopentane-1,3-dione (I) is condensed with an alkyl acrylate, (II, R'=alkyl having 1 to 6 carbon atoms), working in an alkaline medium, preferably an anhydrous alkaline medium such as an amine in an inert anhydrous organic solvent, for example a trialkylamine such as triethylamine in ethyl acetate, to obtain the alkyl 3-(1'-R-2',5'-dioxo-cyclopentyl)-propionate (III, R'=alkyl having 1 to 6 carbon atoms), (inactive by nature). This latter compound is reacted with a ketalization agent. The resultant alkyl dl - 3 - (1' - R - 2' - X' - 5' - oxo-cyclopentyl)-propionate (IV, R'=alkyl having 1 to 6 carbon atoms) is saponified with the aid of an aqueous alkaline agent. The resolution of the dl-3-(1'-R-2'-X'-5'-oxo-cyclopentyl)-propionic acid obtained (V) into their optical antipodes is conducted with the aid of an optically active base. The isomer of the natural configuration of 3-(1'-R-2'-X'-5'-oxo-cyclopentyl)-propionic acid (VA), is subjected to the action of a lactonization agent. The corresponding lactone of the 3-(1'-R-2'-X'-5'-hydroxy - 4 ' -cyclopentenyl) - propionic acid (VI) is obtained, which is condensed with a 3-m-methoxy-phenyl-propyl magnesium halide (VII, halide= Hal). The condensation product is subjected to the action of an alkaline agent, thus obtaining 3-methoxy-13β-R-17-X'-9,10-seco-Δ$^{1,3,5(10),8(14)}$ - gonatetraene - 9 - one (VIII), which is subjected to the action of an acidic cyclization agent, and the desired 3 - methoxy - 13β-R-Δ$^{1,3,5,(10)8(14)}$-gonapentaene-17-one (IX) is isolated.

As it has been stated above, a considerable advantage of the present process lies in the fact that it allows the recovery of the undesired isomer obtained at the time of the resolution. For this purpose, this isomer is subjected to the action of an aqueous acid, which induces the cleavage of the ketal function and isomerization to give 3-(1' - R - 2',5'-dioxo-cyclopentyl) - propionic acid (VC), inactive by nature. This compound (VC) is then converted into dl - 3 - (1' - R - 2' - X' - 5' - oxo - cyclopentyl)-propionic acid (V) by the action of a ketalization agent, followed by an aqueous alkaline treatment, the purpose of which is to saponify the ester of the carboxyl function which is intermediately formed. This results in the cyclic utilization of the undesired isomer in the overall synthesis.

Of the various modes of execution, the present process can be characterized particularly by the following points.

(1) The alkalinity of the condensation medium of the condensing of 2-R-cyclopentane-1,3-dione with an alkyl acrylate is assured by the presence of a tertiary amine, such as triethylamine. The reaction is preferably conducted in an anhydrous organic solvent such as ethyl acetate.

(2) The ketalization agent, which is reacted with the alkyl 3-(1'-R-2',5'-dioxo-cyclopentyl) - propionate (III) is an alkylene glycol having 2 to 4 carbon atoms or a dioxolane, such as methylethyldioxolane in the presence of ethylene glycol. The work is conducted in the presence of an acid catalyst, such as p-toluene sulfonic acid or methylsulfonic acid.

(3) The saponification of the alkyl dl-3-(1'-R-2'-X'-5'-oxo-cyclopentyl)-propionate (III) is effected with the aid of an aqueous alkaline base, for example an aqueous alkali metal hydroxide such as sodium hydroxide or potassium hydroxide.

(4) The resolution of the dl-3-(1'-R-2'-X'-5'-oxo-cyclopentyl)-propionic acid (V) is realized with the aid of an optically active base, such as cinchonine, D(—)-threo-(1-p-nitrophenyl)-2-N,N-dimethylamino-propane 1,3-diol or 1-nor adrenaline. The salt of the acid of the natural configuration with the optically active base is separated and alkalinized to release the desired acid. The optically active base is recovered by conventional methods.

(5) The lactonization agent employed to lactonize compound 5A is the anhydride of a lower alkanoic acid, such as acetic acid anhydride, in the presence of an alkali metal salt of a lower alkanoic acid, such as sodium acetate.

(6) The condensation of the optically active lactone of 3-(1'-R-2'-X'-5'-hydroxy-4'-cyclopentenyl)-propionic acid (VI) with a 3-m-methoxy-phenyl-propyl magnesium halide, such as the bromide, is conducted in an ether, such as tetrahydrofuran under customary Grignard condensation methods, and the subsequent alkaline treatment is realized with the aid of a strong alkaline base, for example an alkali metal hydroxide in a lower alkanol such as methanolic potassium hydroxide. A small amount of water is preferable in the reaction mixture.

(7) The cyclization agent employed to cyclize compound VIII is a strong dehydrating acid, such as a mineral acid, for example sulfuric acid, hydrochloric acid and phosphoric acid, or an organic acid, for example a sulfonic acid.

(8) The cyclization agent is preferably a mixture of phosphoric acid and phosphoric acid anhydride. The work is carried out at a temperature of about 70° C.

The invention also includes a variant of the process, described in the preceding, wherein the alkyl acrylate (II) is replaced by acrylonitrile. The condensation of acrylonitrile with 2-R-cyclopentane-1,3-dione (I) in alkaline medium is conducted in the same manner and gives 3-(1'-R-2',5'-dioxo-cyclopentyl)-propionitrile, which is subjected to the action of a ketalization agent in the same manner as described above. The thus-formed dl-3-(1'-R-2'-X'-5'-oxo-cyclopentyl)-propionitrile is saponified with a strong alkaline agent in the same manner as described above, thus obtaining dl-3-(1'-R-2'-X'-5'-oxo-cyclopentyl)-propionic acid (V), and the synthesis is pursued as previously described.

Moreover, in a general manner, the present invention also relates, as a variant of the process, to the utilization of a compound as starting material, which was obtained as an intermediate product in any stage of the process, and to the realization of the remaining stages of the process.

The gonapentaenes, obtained according to the process of the invention can be easily converted into other steroid derivatives, endowed with interesting pharmacological properties, such as 19-nor-testosterone or 13β-ethyl-18,19-di-nor-testosterone as described in the examples.

When $R_6$ is $CH_3$, $R_1$, $R_2$, $R_4$, $R_5$ are hydrogen and $R_3$ is methyl, the final compound can be converted into 7-methyl-estrone which is the starting material for the synthesis of a number of 19-nor 7-methyl-steroids as indicated by G. Anner (Chemia, 20, 1966, pp. 434–435).

When $R_5$ is methyl, R is methyl or ethyl, $R_1$, $R_2$, $R_4$, $R_6$ are hydrogen and $R_3$ is methyl, the final compound can be converted into 6-methyl, 13-methyl or ethyl estradiol derivatives from which 6-methyl physiologically active compounds can be obtained (B.F., 1465484 and Douglas, Tetrahedron, 1966, p. 1019).

When R is methyl, $R_1$ is hydrogen, $R_2$ and $R_4$ are methoxy, $R_3$ is methyl, $R_5$ and $R_6$ are both hydrogen, the resulting estra-pentaene is a starting material for producing 2,3,4-trimethoxy $\Delta^{1,3,5(10)}$-estratriene-17β-ol which is a potent analgesic.

For anyone skilled in the art, it is obvious that, according to the optically active base selected for the resolution of the racemic acid of the Formula V, either one or the other of the two epimers possible is preferentially isolated. This allows the obtention, if so desired, not only of the steroids of the natural series, but also in their antipodes. It is also obvious to those skilled in the art that the resolution step can be omitted and the racemic mixture of the final steroids can be obtained.

In addition, as a variant of the process of the invention, it should be noted that, at the time of the execution of this process, the reaction product, formed by condensation of the optically active lactone of 3-(1'-R-2'-X'-5'-hydroxy-4'-cyclopentenyl)-propionic acid with a halide of 3-m-methoxy phenyl-propyl magnesium, can be converted in one single step into 3-methoxy-13-R-$\Delta^{1,3,5(10),8(14)}$-gonapentaene-17-one by the action of a cyclization agent.

The following examples will serve for better comprehension of the invention. However, it is to be understood that they do not limit the scope of the invention in any manner.

EXAMPLE 1

Preparation of levorotatory 3-methoxy-$\Delta^{1,3,5(10),8,14}$-estrapentaene-17-one Step A: Preparation of ethyl 3-(1'-methyl-2',5'-dioxo-cyclopentyl)-propionate.—Under an atmosphere of nitrogen, 50 gm. of 2-methylcyclopentane-1,3-dione, 125 cc. of ethyl acetate, 240 cc. of ethyl acrylate and 118 cc. of a 20% solution of triethylamine in ethyl acetate were introduced into 125 cc. of anhydrous ethyl acetate. The mixture was brought to reflux, which was maintained for 19 hours. Thereafter, the mixture was concentrated to dryness, under reduced pressure, the residue was rectified, and 86.54 gm. of ethyl 3-(1'-methyl-2',5'-dioxo-cyclopentyl)-propionate were obtained. The compound had a boiling point of 117°–119° C. under a pressure of 0.55 mm. of mercury.

The product obtained was a liquid having an index of refraction, $n_D^{20}=1.4685$.

Analysis.—Calculated for $C_{11}H_{16}O_4$ (molecular weight =212.24), percent: C, 62.24; H, 7.6. Found, percent: C, 62.2; H, 7.7.

Step B: Preparation of ethyl dl-3-(1'-methyl-2',2'-ethylenedioxy-5'-oxo-cyclopentyl)-propionate. — Under an atmosphere of nitrogen, first 0.750 gm. of monohydrated paratoluene sulfonic acid, then 21.2 gm. of ethyl 3-(1'-methyl-2',5'-dioxo - cyclopentyl) - propionate were introduced into a mixture consisting of 200 cc. of benzene, 200 cc. of methylethyldioxolane and 3 cc. of ethyleneglycol. The mixture was agitated over a period of seven days at room temperature. Thereafter, 1.2 cc. of triethylamine were added to the reaction mixture. Benzene was eliminated by distillation, then ethyl acetate was added. The organic solution obtained was washed first with a saturated aqueous solution of sodium bicarbonate, then with a saturated aqueous solution of sodium chloride, and finally with water. Next, the solution was dried and concentrated to dryness.

The residue was rectified under reduced pressure, obtaining thus 16.78 gm. of ethyl dl-3-(1'-methyl-2',2'-ethylenedioxy-5'-oxo-cyclopentyl) - propionate. The product had a boiling point of 130°–132° C. under a pressure of 0.15 mm. of mercury.

This product was a liquid with a refraction index, $n_D^{20}=1.473$.

Analysis.—Calculated for $C_{13}H_{20}O_5$ (molecular weight =256.29), percent: C, 60.91; H, 7.86. Found, percent: C, 61.0; H, 7.6.

This product is not described in the literature.

Step C: Preparation of dl-3-(1'-methyl-2',2'-ethylenedioxy-5'-oxo-cyclopentyl)-propionic acid.—Under an atmosphere of nitrogen, 12 gm. of ethyl dl-3-(1'-methyl-2',2' - ethylenedioxy - 5' - oxo - cyclopentyl) - propionate were introduced into a mixture of 48.5 cc. of water and 30 cc. of a 2 N aqueous solution of sodium hydroxide. The mixture was agitated for 1 hour and 45 minutes at room temperature, then cooled to 0° C., and the pH of the reaction medium was adjusted to about 8 by an addition of a 10% aqueous solution of potassium acid sulfate. The aqueous phase was extracted with ethyl ether and these extracts were eliminated. Next, the pH of the aqueous solution was adjusted to 4.0 by an addition of potassium acid sulfate. The reaction medium was saturated with sodium chloride, extracted with ethyl ether and the ether extracts were combined. The solution obtained was washed with a saturated aqueous solution of sodium chloride, dried and concentrated to dryness.

The resultant residue was crystallized from a mixture of isopropyl ether and petroleum ether, thus obtaining 8.85 gm. of dl-3-(1'-methyl-2',2'-ethylenedioxy-5'-oxo-cyclopentyl)-propionic acid. The product had a melting point of 66° C.

A sample of this product was purified by a new crystallization from a mixture of isopropyl ether and petroleum ether. The crystallized sample had a melting point of 66° C.

Analysis.—Calculated for $C_{11}H_{16}O_5$ (molecular weight =228.24), percent: C, 57.88; H, 7.06. Found, percent: C, 57.7; H, 6.9.

This product is not described in the literature.

Step D: Resolution (1) by cinchonine.—(a) Formation of the cinchonine salt of the dextrorotatory 3-(1'-methyl-2',2'-ethylenedioxy-5'-oxo - cyclopentyl) - propionic acid: 11.6 gm. of cinchonine base was introduced into 180 cc. of ethanol. The mixture was agitated for 15 minutes at room temperature then brought to reflux under agitation, and 10 gm. of dl-3-(1'-methyl-2',2'-ethylenedioxy-5'-oxo-cyclopentyl)-propionic acid were introduced into the reaction mixture, which was then agitated for 10 minutes further while being maintained at reflux. Thereafter, 80 cc. of the ethanol were eliminated by distillation. Next, the reaction mixture was brought to a temperature of 20° C. and agitated at this temperature for 1 hour. Then the temperature of the reaction mixture was reduced to a temperature ranging between 0° and +5° C., and the reaction mixture was agitated at this temperature for 2 hours. Thereafter it was allowed to stand for 15 hours while this temperature was maintained. The precipitate formed was separated by filtration and washed with cold ethanol. In this manner, 15.4 gm. of raw d-cinchonine salt were obtained, having a specific rotation of $[\alpha]_D^{20}=+119°$ (c.=1% in ethanol). This product was purified by recrystallization from ethanol, thus obtaining the dextrorotatory cinchonine salt of 3-(1'-methyl-2',2'-ethylenedioxy - 5' - oxo-cyclopentyl)-propionic acid. The product had a melting point of 186° with a specific rotation of $[\alpha]_D^{20}=+127.5°$ (c.=1% in methanol).

Circular dichroism: (ethanol) at 295 mμ, $\Delta\epsilon=+1.25$.

This product is not described in the literature.

(b) Isolation of the dextrorotatory d-3-(1'-methyl-2',2'-ethylenedioxy-5'-oxo-cyclopentyl)-propionic acid. 5 gm. of the dextrorotatory cinchonine salt of 3-(1'-methyl - 2',2' - ethylenedioxy-5'-oxo-cyclopentyl)-propionic acid were placed in suspension in 25 cc. of water. Then under agitation, 1.13 gm. of a 10.7 N aqueous ammonium hydroxide solution were added, dropwise, and the solution was agitated for 30 minutes at room temperature. The insoluble matter was eliminated by filtration. The filtrate obtained was saturated with sodium chloride and acidified to a pH of 4.0 with an aqueous solution of potassium acid sulfate. The aqueous phase was extracted with ether. The ethereal solutions were combined and the organic solution obtained was washed with a saturated aqueous solution of sodium chloride, then dried and concentrated to dryness. The resultant residue was purified by crystallization from a mixture of isopropyl ether and hexane, thus obtaining d-3-(1'-methyl - 2',2' - ethylenedioxy-5'-oxo-cyclopentyl)-propionic acid. The product had a melting point of 70°–71° C. and a specific rotation $[\alpha]_D^{20} = +9.3°$ (c.=1.1% in dioxane).

Circular dichroism: (ethanol) at 302 mµ, $\Delta\epsilon = +0.58$.

This product is not described in the literature.

(c) Isolation and recovery of the undesired isomer: The residual cinchonine salts, resulting from the resolution and obtained by distillation to dryness of the liquors of crystallization of the diastereoisomer corresponding to the dextrorotatory acid, were decomposed, and the raw free acid was separated as indicated in the preceding paragraph (b).

In this manner, 16 gm. of cinchonine salts produced 7.5 gm. of raw acid, which was treated under agitation for 15 minutes at 95° to 100° C. with 75 cc. of water and 19 cc. of N sulfuric acid, then cooled, vacuum filtered and washed. Thus, the 3-(1'-methyl-2',5'-dioxo-cyclopentyl)-propionic acid (inactive by nature) was obtained, having a melting point of 126° C.

9.2 gm. of the acid, previously obtained and having a melting point of 126° C., were treated over a period of 135 hours under agitation and at a temperature of 20° C. with 100 cc. of methylethyldioxolane, 100 cc. of anhydrous benzene, 1.5 cc. of ethyleneglycol and 0.375 gm. of p-toluenesulfonic acid.

Thereafter, 0.62 cc. of triethylamine were added to the reaction solution, which was then washed with water and distilled to dryness. The residue obtained was treated under vigorous agitation for 5 hours at 25° C. with 48 cc. of water and 35 cc. of 2 N sodium hydroxide. The pH was adjusted to 8 by an addition of 10% aqueous KHSO₄ (about 26 cc.), and the reaction solution was extracted with methylene chloride.

The separated aqueous solution was admixed with 20 gm. of NaCl, cooled to +5° C. and adjusted to a pH of 3.5 to 4 by an addition of 10% aqueous KHSO₄ (about 38 cc.). The mixture was extracted with ether and the extract was distilled to dryness. The residue, crystallized from isopropyl ether and petroleum ether, supplied dl-(1' - methyl - 2',2' - ethylenedioxy-5'-oxo-cyclopentyl)-propionic acid. The product obtained had a melting point of 66° C., identical to the product previously obtained.

Resolution (2) by D(—)-threo-(1-p-nitrophenyl)-2-N,N-dimethylamino-propane-1,3-diol. — (a) Preparation of the D(—)-threo-(1-p-nitrophenyl) - 2 - N,N-dimethylamino-propane-1,3-diol salt of the dextrorotatory 3-(1'-methyl - 2',2' - ethylenedioxy-5'-oxo-cyclopentyl)-propionic acid: 5 gm. of dl-3-(1'-methyl-2',2'-ethylenedioxy-5'-oxo-cyclopentyl)-propionic acid were introduced into 25 cc. of methanol, then 5.35 gm. of D(—)-threo-(1-p-nitrophenyl)-2-N,N-dimethylamino-propane - 1,3 - diol (described in copending, commonly-assigned U.S. patent application Ser. No. 610,219, filed Jan. 19, 1967 and French Patent No. 1,481,978) were added, and the mixture was agitated for 1 hour and 45 minutes at room temperature. It was then allowed to stand for 15 hours at +5° C. The precipitate formed was vacuum filtered, washed with methanol and dried. The raw product thus obtained was purified by crystallization from methanol and 3.6 gm. of the D(—)-threo-(1-p-nitrophenyl)-2-N,N-dimethylamino-propane-1,3-diol salt of the dextrorotatory 3-(1'-methyl - 2',2' - ethylenedioxy-5'-oxo-cyclopentyl)-propionic acid were obtained. The product had a melting point of 145° C. and a specific rotation of $[\alpha]_D^{20} = -19.7°$ (c.=0.9% in methanol).

Circular dichroism (in ethanol) $\Delta\epsilon = +0.47$ at 297 mµ.

This product is not described in the literature.

Decomposition of the salt and obtention of the dextrorotatory 3 - (1'-methyl-2'-2'-ethylenedioxy-5'-oxo-cyclopentyl)-propionic acid: 2 gm. of the D(—)-threo-(1-p-nitrophenyl)-2-N,N-dimethylamino-propane - 1,3 - diol salt of the dextrorotatory 3-(1'-methyl-2',2'-ethylenedioxy-5'-oxo-cyclopentyl)-propionic acid, as previously prepared, were introduced into a mixture of 10 cc. of water and 0.4 cc. of 10.7 N aqueous ammonium hydroxide solution. Next, the mixture was agitated for 1 hour at room temperature, the insoluble, which is constituted by D(—)-threo-(1-p-nitrophenyl) - 2 - N,N-dimethylamino-propane-1,3-diol, was vacuum filtered, then washed first with water, then with normal sodium hydroxide and again with water. These wash liquors were combined with the filtrate obtained. This filtrate was then extracted with ethyl acetate to completely eliminate any base still present. The aqueous filtrate was saturated with sodium chloride and acidified, to obtain a pH of 3.5 to 4.0, with an aqueous solution of potassium acid sulfate. The aqueous solution with a pH of 3.5 to 4.0 was extracted with ethyl acetate. The extracts were combined, washed with water saturated with sodium chloride, dried and finally concentrated to dryness under reduced pressure.

The residue was crystallized from isopropyl ether, thus obtaining 0.725 gm. of dextrorotatory 3-(1'-methyl-2',2' - ethylenedioxy - 5' - oxo - cyclopentyl) - propionic acid. The product had a melting point of 70°–71° C. and a specific rotation $[\alpha]_D^{20} = +9.3°$ (c.=1.1% in dioxane).

Circular dichroism (in dioxane) $\Delta\epsilon$ at 302 mµ = +0.58.

This product is identical to the dextrorotatory 3-(1'-methyl - 2',2'-ethylenedioxy - 5' - oxo-cyclopentyl)-propionic acid, described in the preceding.

After the methanolic mother liquors of formation and crystallization of the salt obtained in (a) had been concentrated to dryness, the raw D(—)-threo-(1-p-nitrophenyl)-2-N,N-dimethylamino-propane - 1,3 - diol salt of the levorotatory 3-(1'-methyl - 2',2' - ethylenedioxy - 5'-oxo-cyclopentyl)-propionic acid was obtained. Starting with this product, the levorotatory acid was prepared, employing a technique analogous to that previously employed for the obtention of the dextrorotatory acid.

The levorotatory acid had a melting point of 70° to 71° C. and a rotatory power of —9.3° (c.=1.1% in dioxane). It could be racemized in a manner analogous to that previously described.

Step E: Preparation of the levorotatory lactone of 3-(1'-methyl-2',2' - ethylenedioxy - 5' - hydroxy - 4' - cyclopentenyl)-propionic acid.—Under an atmosphere of nitrogen, first 0.078 gm. of anhydrous sodium acetate, then 6.5 gm. of dextrorotatory 3-(1'-methyl-2',2'-ethylenedioxy-5'-oxo-cyclopentyl)-propionic acid were introduced into 97 cc. of acetic acid anhydride. The mixture was brought to reflux and maintained at reflux for 20 hours. Thereafter, 20 cc. of acetic acid anhydride were added, then the reaction mixture was slowly distilled under normal pressure, until 30 cc. of distillate had been recovered. Next, the reaction mixture was concentrated to dryness under reduced pressure. The residue was dissolved in ethyl ether, the ethereal solution was washed first with an aqueous solution of sodium bicarbonate, then with water, dried and concentrated to dryness.

The residue was subjected to chromatography through silica gel, thus obtaining 1.31 gm. of the levorotatory lactone of 3-(1'-methyl - 2',2' - ethylenedioxy - 5' - hydroxy-4'-cyclopentenyl)-propionic acid. The product had a melting point of 56° C., and a specific rotation $[\alpha]_D^{20} = -134.5°$ (c.=1.02% in dioxane).

Circular dichroism (in ethanol) at 229 mµ, $\Delta\epsilon = -10.99$.

This product is not described in the literature.

Step F: Preparation of 3-methoxy-17,17-ethylenedioxy-9,10-seco-$\Delta^{1,3,5(10),8(14)}$-estratetraene-9 - one.—(a) Preparation of 3-(m-methoxyphenyl)-propyl-magnesium bromide: In an inert atmosphere, 1.06 gm. of magnesium shavings and a small crystal of iodine were introduced into a dry container. The mixture was heated over a flame until the iodine was sublimated, then the mixture was allowed to cool. Within the space of about 30 minutes at 40° to 45° C., a solution of 10 gm. of 1-bromo-3-(m-methoxyphenyl)-propane dissolved in 40 cc. of tetrahydrofuran was introduced, after having first started the reaction by the rapid introduction of a small amount of the solution of the brominated derivative. The reaction mixture was agitated over a period of 2 hours, obtaining a solution of 3-(m-methoxyphenyl)-propyl magnesium bromide which had a titer of 0.42 mol/liter.

(b) Condensation of 3-(m-methoxyphenyl)-propyl magnesium bromide with the levorotatory lactone of 3-(1′-methyl-2′2′-ethylenedioxy - 5′ - hydroxy - 4′ - cyclopentenyl)-propionic acid: In an inert atmosphere, 0.87 gm. of the levorotatory lactone of 3-(1′-methyl-2′,2′-ethylenedioxy-5′-hydroxy - 4′ - cyclopentenyl) - propionic acid were introduced into 20 cc. of tetrahydrofuran. The temperature of the reaction mixture was brought to —55° C., then, dropwise, 14.8 cc. of a 0.42 M solution of 3-(m-methoxyphenyl)-propyl magnesium bromide in tetrahydrofuran were added. The mixture was agitated for 30 minutes at —55° C., then the temperature was allowed to raise to —20° C. within 25 minutes. This temperature was maintained for 15 minutes. Thereafter, the reaction mixture was cooled to —55° C., and 10 cc. of a saturated aqueous solution of ammonium sulfate and 50 cc. of ethyl ether were added thereto. The ethereal phase was decanted and washed with water. The aqueous phases were extracted with benzene and the organic phases were combined, washed with a saturated aqueous solution of sodium chloride, dried and concentrated to dryness. In this manner, 2.17 gm. of product were obtained.

(c) Alkaline treatment: 2.17 gm. of the product obtained in (b) were introduced into a mixture of 22 cc. of 1.36 N potassium hydroxide in methanol and 1.5 cc. of water. The mixture was brought to reflux and maintained at reflux for ½ hour. Then the mixture was cooled, ice was added thereto and the pH was adjusted to 8 by an addition of acetic acid. Next, the reaction mixture was extracted with ethyl acetate. The extracts were washed with a saturated aqueous solution of sodium chloride, dried and evaporated to dryness. The resultant residue was purified by chromatography through silica gel, thus obtaining 0.56 gm. of 3-methoxy-17,17-ethylenedioxy-9,10-seco-$\Delta^{1,3,5(10),8(14)}$-estratetraene-9-one.

Ultra-violet Spectra (in ethanol) max.: 252 m$\mu$, $\epsilon=7,940$.

This product is not described in the literature.

Step G: Preparation of methyl ether of 8,9-14,15-bis-dehydro-estrone.—At room temperature and in an inert atmosphere, 0.520 gm. of 3-methoxy-17,17-ethylenedioxy-9,10-seco-$\Delta^{1,3,5(10),8(14)}$-estratetraene - 9 - one (optically active) were introduced into 6 gm. of a mixture of 10 gm. of phosphoric acid anhydride and 8 cc. of an 85% phosphoric acid solution. This mixture was agitated for 30 minutes at 75° C. Next, the reaction mixture was cooled and ice was added thereto. The mixture was again agitated for 10 minutes and then extracted with ethyl acetate. The organic solutions of the extraction were combined. The organic solution obtained was washed first with an aqueous solution of sodium bicarbonate, then with water, dried and concentrated to dryness.

The residue was subjected to chromatography through a bed of silica, thus obtaining levorotatory 3-methoxy-$\Delta^{1,3,5(10),8,14}$-estrapentaene - 17 - one (or the methyl ether of 8,9-14,15-bis-dehydro - estrone). The product had a melting point of 142° C. and a specific rotation of $$[\alpha]_D^{20} = -100°$$

(c.=0.5% in chloroform).

The levorotatory 3-methoxy-$\Delta^{1,3,5(10),8,14}$-estrapentaene-17-one could be converted into 19-nor-testosterone in the following manner:

Step A: Methyl ether of 8,9-dehydro-estrone.—150 cc. of acetone containing 2% of pyridine and 1.2 gm. of alumina containing 5% of palladium were introduced into a hydrogenation apparatus. The apparatus was then purged. The mixture was agitated for 2 hours and 30 minutes under an atmosphere of hydrogen. Thereafter while avoiding any contact with atmospheric air, a deoxygenated solution of 6 gm. of levorotatory 3-methoxy $\Delta^{1,3,5(10),8,14}$-estrapentaene-17-one (or the methyl ether of 8,9-14,15-bis-dehydro-estrone) in 450 cc. of acetone containing 2% of pyridine was introduced into the apparatus. The mixture was agitated under an atmosphere of hydrogen, and within the space of 2 hours about 525 cc. of hydrogen were absorbed. Next, the apparatus was purged with nitrogen and the catalyst was removed by filtration. The acetonic solution was concentrated to dryness, and 6 gm. of raw product were obtained, having a melting point of 120° C.

This raw product was purified by crystallization from ethanol, thus obtaining the dextrorotatory 3-methoxy-$\Delta^{1,3,5(10),8(9)}$-estratetraene-17-one, (or the methyl ether of 8,9-dehydro-estrone). This product had a melting point of 128° C. and a specific rotation of $[\alpha]_D^{20} = +29°$ (c.=1% in chloroform).

Ultra-violet spectra (in ethanol) $\lambda_{max}$. at 211 m$\mu$, $\epsilon=18,050$; $\lambda_{max}$. at 279 m$\mu$, $\epsilon=16,350$.

Step B: 19-nor testosterone.—At a temperature of —70° C., a solution of 0.15 gm. of the methyl ether of 8,9-dehydro-estrone in 11 cc. of tetrahydrofuran and 0.1 cc. of ethanol were added to 30 cc. of liquid ammonia. Within the space of 3 hours and 30 minutes, 0.12 gm. of lithium in small pieces and 1 cc. of ethanol in fractions of 0.1 cc. were added. This addition was followed by an addition of 2 cc. of ethanol, then 10 cc. of water. The ammonia was then removed. The reaction mixture was taken up in methylene chloride, washed with water and distilled under vacuum. The residue was then taken up in 10 cc. of methanol and 2 cc. of concentrated hydrochloric acid. The mixture was heated at reflux for 25 minutes, diluted with water and extracted with methylene chloride. The extracts were washed and distilled to dryness. In this manner, 0.148 gm. of product was obtained, which purified by chromatography, supplied 19-nor-testosterone with a yield of about 50%. The product was identical to a sample prepared by a different method.

EXAMPLE 2

Preparation of dl-3-(1′-methyl - 2′2′ - ethylenedioxy-5′-oxo-cyclopentyl) - propionic acid by condensation of 2-methylcyclopentane-1,3-dione with acrylonitrile Step A: Preparation of 3-(1′-methyl-2′,5′-dioxo-cyclopentyl)-propionitrile.—Over a period of 64 hours, 20 gm. of 2-methyl-cyclopentane-1,3-dione in 100 cc. of ethyl acetate containing 10% of triethylamine and 58.5 cc. of acrylonitrile were heated at reflux. Thereafter, the solvents and the excess of the reactant were evaporated under vacuum. The residual oil was distilled under a pressure of 0.2 to 0.3 mm. of mercury. 22 gm. of 3-(1′-methyl-2′,5′-dioxo - cyclopentyl) propionitrile were recovered passing over at 136° to 140° C.

Analysis.—Calculated for $C_9H_{11}O_2N$ (molecular weight =165.19), percent: C, 65.43; H, 6.71; N, 8.48. Found, percent: C, 65.2; H, 6.7; N, 8.4.

Step B: Preparation of dl-3-(1′-methyl-2′,2′-ethylenedioxy-5′-oxo-cyclopentyl) - propionitrile.—Over a period of 9 hours, 5 gm. of 3-(1′-methyl-2′5′-dioxo-cyclopentyl)- propionitrile in 50 cc. of methyl-ethyldioxolane containing 2% of ethyleneglycol and 1 gm. of p-toluenesulfonic acid were agitated at a temperature of 20° C. Then, 2 cc. of triethylamine were added and the mixture was diluted with water. The reaction mixture was then extracted with methylene chloride, the extracts were washed with water and distilled to dryness. In this manner, 6.5 gm. of dl-3-(1'-methyl -2',2' - ethylenedioxy - 5' - oxy-cyclopentyl)-propionitrile were recovered.

This product is not described in the literature.

Step C: Preparation of dl-3-(1'-methyl-2',2'-ethylenedioxy-5' - oxo - cyclopentyl) - propionic acid.—Under agitation, 1 cc. of ethyleneglycol, 2 cc. of water and 0.5 cc. of a potassium hydroxide solution (containing 700 gm./liter) were heated for 15 minutes at 100° to 110° C. with 0.3 gm. of dl-3-(1'-methyl-2',2'-ethylenedioxy - 5' - oxo-cyclopentyl)-propionitrile. The mixture was cooled and extracted with methylene chloride. The separated aqueous solution was acidified to a pH of 3.5 to 4 by an addition of $KHSO_4$ and then extracted with ethyl acetate. The organic extract, brought to dryness, supplied dl-3-(1'-methyl-2', 2'-ethylenedioxy - 5' - oxo - cyclopentyl)-propionic acid, identical to the product obtained according to Example 1, Step C.

EXAMPLE 3

Preparation of 3-methoxy-13β-ethyl-$\Delta^{1,3,5(10),8,14}$-gonapentaene-17-one Step A: Preparation of ethyl 3-(1'-ethyl-2',5-dioxocyclopentyl)-propionate.—200 gm. of 2-ethyl-cyclopentane-1,3-dione were introduced into a mixture of 1000 cc. of ethyl acrylate and 1000 cc. of ethyl acetate containing 10% of triethylamine. Under an atmosphere of nitrogen, the reaction mixture was brought to reflux, and maintained at reflux for 21 hours. Thereafter, the solution obtained was concentrated to dryness under reduced pressure. The resultant residue was rectified under vacuum.

321 gm. of ethyl 3-(1'-ethyl-2',5'-dioxo-cyclopentyl)-propionate were obtained, having a boiling point of 126° C. under a pressure of 0.5 mm. of mercury $n_D^{20}=1.4700$.

This compound is not described in the literature.

Step B: Preparation of ethyl dl-3-(1'-ethyl-2',2'-ethylenedioxy-5'-oxo-cyclopentyl)-propionate.—6 gm. of paratoluene sulfonic acid and 200 gm. of ethyl 3-(1'-ethyl-2',5'-dioxo-cyclopentyl)-propionate were introduced into a mixture of 2000 cc. of methylene chloride, 2000 cc. of methylethyldioxolane and 50 cc. of ethyleneglycol. Under an atmosphere of nitrogen, the reaction mixture was brought to reflux while recycling the condensate through a column of dehydrating material, such as alkaline alumino silicate. The reaction mixture was maintained at reflux over a period of 12 days while replenishing the dehydrating agent and introducing three times into the reaction mixture, 1.5 gm. of paratoluene sulfonic acid and 10 gm. of ethyleneglycol. Thereafter, the reaction mixture was cooled and rendered alkaline with triethylamine. The organic solution was washed first with a saturated aqueous solution of sodium bicarbonate, then with water. The aqueous extracts were combined and extracted with methylene chloride. This chloromethylenic extract was added to the principal organic solution. The organic solution obtained was dried and concentrated to dryness under reduced pressure. Thus, 248.4 gm. of raw ethyl 3-(1'-ethyl-2',2'-ethylenedioxy-5'-oxo-cyclopentyl)-propionate (product A) were obtained. This product was utilized as such for the obtention of the free acid.

A sample of this product was rectified under reduced pressure. Its boiling point was 160° C. under a pressure of 2.5 mm. of mercury, $n_D^{20}=1.4790$.

This compound is not described in the literature.

Step C: Preparation of dl-3-(1'-ethyl-2',2'-ethylenedioxy-5'-oxocyclopentyl)-propionic acid.—248.4 gm. of the product A, obtained in the preceding step, were introduced into 1430 cc. of a 2 N aqueous solution of sodium hydroxide. Then the reaction mixture was agitated for 3 hours at room temperature. Thereafter, the reaction mixture was cooled to +5° C. and brought to a pH of 9.0 by an addition of an aqueous solution of potassium acid sulfate. Next, the alkaline aqueous solution was extracted with ether and then saturated with sodium chloride. The temperature of the aqueous solution was maintained at +5° C. and the pH was adjusted to 4.0 by an addition of an aqueous solution of potassium acid sulfate. The aqueous acidic solution was extracted with ether while re-adjusting the pH to 4.0 after each extraction. The ethereal extracts were washed with a saturated aqueous solution of sodium chloride, then dried, decolorized with animal carbon black and concentrated to dryness under reduced pressure. Next, the residue was crystallized from isopropyl ether, thus obtaining in two yields, 148.6 gm. of 3-(1-ethyl-2',2'-ethylenedioxy-5'-oxo-cyclopentyl)-propionic acid. The product had a melting point of 76° C. to 77° C.

A sample of this product was recrystallized from isopropyl ether to give a melting point of 77° C.

By dissolution in ethyl acetate and an addition of 2,5-diphenyl-piperazine, the 2,5-diphenyl-piperazine salt of 3-(1'-ethyl-2',2'-ethylenedioxy-5'-oxo - cyclopentyl) - propionic acid was obtained. The melting point of this product was 142° C. and the nitrogen titer of the product was 3.8 gm./100 gm. (theoretical 3.82).

This compound is not described in the literature.

Step D: Resolution.—(a) Formation and isolation of the satl of the levorotatory nor-adrenaline and of the dextrorotary 3-(1'-ethyl-2',2'-ethylenedioxy-5'-oxo-cyclopentyl propionic acid: 30 cc. of hot water were poured over a mixture of 20 gm. of dl-3-(1'-ethyl-2',2'-ethylenedioxy-5'-oxo-cyclopentyl)-propionic acid and of 14 gm. of levorotatory 2 - amino - 1 - (4',4'-dihydroxyphenyl)-ethanol. Under agitation, the reaction mixture was heated in a water bath. The small amount of insoluble residual matter was eliminated by filtration. Crystallization was initiated by scraping and maintaining the solution at 0° C. over a period of 48 hours, in the total absence of light. The precipitate formed was isolated by vacuum filtering, triturated in an aqueous solution of sodium chloride and dried under reduced pressure. This raw product was purified by three successive recrystallizations from an aqueous solution of sodium chloride, thus obtaining 9.4 gm. of the levorotatory nor-adrenaline base salt of the dextrorotatory 3-(1'-ethyl-2',2'-ethylenedioxy-5'-oxo - cyclopentyl) - propionic acid. The compound had a melting point of 184° C. and a specific rotation $[\alpha]_D^{20}=-26°$ (c.=1% in water).

A sample of this product was crystallized from water and had a melting point of 185° C.

Circular dichroism (in ethanol) $\Delta\epsilon$ at 288–290 m$\mu$= +0.34.

This compound is not described in the literature.

By saturation of the mother liquors resulting from the crystallization of the raw product in sodium chloride, by alkalization with ammonium hydroxide, by vacuum filtration followed by washing the precipitate formed, the levorotatory nor-adrenaline base was recovered. The product had a melting point of 242° C., determined on the Kofler block.

(b) Isolation of the dextrorotatory 3-(1'-ethyl-2',2'-ethylenedioxy - 5' - oxo-cyclopentyl)-propionic acid: 4.68 gm. of the levorotatory nor-adrenaline base salt of dextrorotatory 3 - (1'-ethyl-2',2'-ethylenedioxy-5'-oxo-cyclopentyl)-propionic acid with a melting point of 184° C. obtained in the preceding, were introduced into 14.1 cc. of water. The mixture was agitated for 30 minutes at room temperature in the total absence of light. Next, the reaction mixture was cooled to +5° C. under an atmosphere of nitrogen and the pH was adjusted to 10.0 by an addition of an aqueous 22° Bé. ammonia solution. The reaction mixture was agitated, then kept at rest for 15 hours at 0° C. The precipitate formed was isolated by vacuum filtration, washed first with a dilute aqueous ammonia solution, then with water and finally dried. In this manner, 1.86 gm. of the levorotatory nor-adrenaline base were obtained.

The combined filtrate and wash waters were saturated with sodium chloride under an atmosphere of nitrogen. The reaction medium was cooled to $+5°$ C., the pH was adjusted to 3.5 by a progressive addition of an aqueous solution of sodium acid sulfate, whereby a precipitate appeared. The reaction mixture was extracted with ether. The combined ether extracts were washed with a saturated aqueous solution of sodium chloride, dried and concentrated to dryness under an atmosphere of nitrogen under reduced pressure. Thus, 2.62 gm. of dextrorotatory 3-(1'-ethyl - 2',2' - ethylenedioxy-5'-oxo-cyclopentyl)-propionic acid were obtained with a specific rotation $[\alpha]_D^{20}=+4.9°$ (c.=1% in dioxane).

Circular dichroism (in dioxane) $\Delta\epsilon$ at 288–290 m$\mu$=0.11.

This compound is not described in the literature.

(c) Isolation of the levorotatory 3-(1'-ethyl-2',2'-ethylenedioxy-5'-oxo-cyclopentyl)-propionic acid: By the action yohimbine on dl-3-(1'ethyl-2',2'-ethylenedioxy-5'-cyclopentyl)-propionic acid, the yohimbine salt of the levrorotatory 3 - (1'-ethyl-2',2'-ethylenedioxy-5'-oxo-cyclopentyl)-propionic acid was obtained, which was purified by crystallization from ethanol. The product had a melting point of 194° C.

Circular dichroism (in dioxane) $\Delta\epsilon$ 285 m$\mu$=+1.4; $\Delta\epsilon$ 270 m$\mu$=+1.7.

This compound is not described in the literature.

The levrorotatory acid was freed and purified by starting with the yohimbine salt in a fashion analogous to that utilized for the obtention of the dextrorotatory acid by starting with the nor-adrenaline salt, thus obtaining levrorotatory 3 - (1'-ethyl-2',2'-ethylenedioxy-5'-oxo-cyclopentyl)-propionic acid. The product had a specific rotation $[\alpha]_D^{20}=-5°$ (c.=1% in dioxane).

Circular dichroism (in dioxane) $\Delta\epsilon$ at 296 m$\mu$=−0.10.

This compound is not described in the literature.

Step E: Preparation of the levorotatory lactone of the dextrorotatory 3-(1'-ethyl-2',2'-ethylene-dioxy-5'-hydroxy-4'-cyclopentenyl)-propionic acid.—In an inert atmosphere, 20 mg. of sodium acetate and 1.53 gm. of d-3-(1'-ethyl-2',2' - ethylenedioxy - 5'-oxo-cyclopentyl)-propionic acid, dextrorotatory, in dioxane, were introduced into 34 cc. of acetic acid anhydride. The reaction mixture was brought to reflux and then was very slowly concentrated, in an inert atmosphere, in order to eliminate nearly half of the acetic acid anhydride within the space of about 15 hours. Thereafter, the reaction mixture was cooled, and benzene and 0.10 cc. of pyridine were added thereto. The reaction medium was then concentrated to dryness, under reduced pressure and an inert atmosphere. The residue was admixed with methylcyclohexane and concentrated to dryness under the same conditions as previously described. This process was repeated several times in succession. The resultant residue was dissolved in a mixture of benzene and ether. The organic solution was washed first with an aqueous solution of sodium bicarbonate, then with water, dried and concentrated to dryness. The resultant residue was then purified by chromatography through silica gel, thus obtaining 1.27 gm. of raw levrorotatory lactone of the dextrorotatory d-3-(1'-ethyl-2',2'-ethylenedioxy-5'-hydroxy-4'-cyclopentenyl)-propionic acid, with a specific rotation $[\alpha]_D^{20}=-110.5°$ (c.=1% in dioxane).

Circular dichroism (in ethanol) $\Delta\epsilon$=−12.1 at 227 m$\mu$; $\Delta\epsilon$=+0.42 at 305 m$\mu$.

This compound is not described in the literature.

Step F: Preparation of 3-methoxy-13$\beta$-ethyl-17,17-ethylene dioxy-9,10-seco-$\Delta^{1,3,5(10),8(14)}$-gonatetraene-9-one.—

(a) Preparation of 3-(m-methoxyphenyl)propyl magnesium bromide: In an inert atmosphere, 1.06 gm. of magnesium shavings and a small iodine crystal were introduced into a dry reaction vessel. The mixture was heated over a uame until the iodine was sublimated, then it was allowed to cool. At a temperature of 40° to 45° C and within about 30 minutes, a solution of 10 gm. of 1-bromo-3-(m-methoxyphenyl)-propane dissolved in 40 cc. of tetrahydrofuran was introduced therein, after having previously initiated the reaction by the rapid introduction of a small quantity of the brominated derivative solution. The reaction mixture was agitated for 2 hours, thus obtaining a solution of 3-(m-methoxyphenyl)-propyl magnesium bromide, which titrated 0.42 mol/liter.

(b) Condensation of 3 - (m - methoxyphenyl)-propyl magnesium bromide with the levorotatory lactone of 3 - (1' - ethyl-2',2'-ethylenedioxy-5'-hydroxy-4'-cyclopentenyl)-propionic acid: In an inert atmosphere, 1.04 gm. of levorotatory lactone of the dextrorotatory 3-(1'-ethyl-2',2' - ethylenedioxy - 5' - hydroxy-4'-cyclopentenyl)-propionic acid were introduced into 24 cc. of tetrahydrofuran. The temperature of the reaction mixture was adjusted to −55° C. Then 17.8 cc. of a 0.42 M solution of 3 - (m - methoxyphenyl)-propyl magnesium bromide in tetrahydrofuran were added, dropwise. The reaction mixture was agitated for 30 minutes at −55° C., then the temperature was allowed to rise to −20° C. within 25 minutes and this temperature was maintained for 15 minutes. The reaction mixture was then cooled to −55° C., and 12 cc. of a saturated aqueous solution of ammonium sulfate and 60 cc. of ethyl ether were added. The ethereal phase was separated by decanting and washed with water. The aqueous phases were extracted with benzene. The organic phases were combined, washed with a saturated aqueous solution of sodium chloride, dried and concentrated to dryness.

(c) Alkaline treatment: The residue obtained in (b) was introduced into a mixture of 26.4 cc. of 1.36 N methanolic potassium hydroxide and 1.8 cc. of water. The mixture was brought to reflux, which was maintained for ½ hour. Then the mixture was cooled by adding ice, and the pH was adjusted to 8 by addition of acetic acid. The reaction mixture was extracted with ethyl acetate. The extracts were washed with a saturated aqueous solution of sodium chloride, dried and evaporated to dryness. The residue was purified by chromatography through silica gel, and the optically active 3-methoxy-13$\beta$-ethyl-17,17-ethylenedioxy - 9,10-seco-$\Delta^{1,3,5(10),8(14)}$-gonatetraene-9-one was obtained.

This product is not described in the literature.

Step G: Preparation of 3 - methoxy - 13$\beta$ - ethyl-$\Delta^{1,3,5(10),8,14}$-gonapentaene-17-one.—At room temperature and in an inert atmosphere, 0.728 gm. of optically active 3 - methoxy - 13$\beta$ - ethyl - 17,17-ethylenedioxy-9,10-seco-$\Delta^{1,3,5(10),8(14)}$-gonatetraene-9-one were introduced into 8.4 gm. of a mixture of 10 gm. of phosphoric acid anhydride and 8 cc. of 85% phosphoric acid solution. This mixture was agitated for 30 minutes at 75° C. Next, the reaction mixture was cooled, ice was added, and the mixture was agitated for 10 minutes and then extracted with ethyl acetate. The organic solutions of the extraction was combined. The organic solution obtained was washed first with an aqueous solution of sodium bicarbonate, then with water, dried and concentrated to dryness.

The resultant residue was subjected to chromatography through a bed of silica, thus obtaining the optically active 3-methoxy-13$\beta$-ethyl-$\Delta^{1,3,5(10),8,14}$-gonapentaene-17-one.

This optically active compound is not described in the literature.

The 3 - methoxy-13$\beta$-ethyl-$\Delta^{1,3,5(10),8,14}$-gonapentaene-17-one could be converted into 13$\beta$-ethyl-18,19-dinor-testosterone in the following manner:

Step A: 3-methoxy 13$\beta$-ethyl-$\Delta^{1,3,5(10),8}$-gonatetraene-17-one.—105 cc. of acetone containing 2% of pyridine and 0.84 gm. of alumina containing 5% of palladium were introduced into a hydrogenation apparatus. This apparatus was purged, then, under an atmosphere of hydrogen, the mixture was agitated for 2 hours and 30 minutes. Avoiding any contact with the atmospheric air, a deoxygenated solution of 4 gm. of optically active 3-methoxy-13$\beta$-ethyl-$\Delta^{1,3,5(10),8,14}$-gonapentaene-17-one in 315 cc. of acetone containing 2% of pyridine was introduced into the apparatus. The mixture was agitated in an atmosphere of hydrogen, and about 368 cc. of hydrogen were absorbed within 2 hours. The apparatus was purged with nitrogen, the catalyst was removed by filtration, and the acetonic solution was concentrated to dryness.

This raw residue was purified by chromatography, thus obtaining the optically active 3 - methoxy - 13β - ethyl-Δ$^{1,3,5(10),8}$-gonatetraene-17-one.

This optically active compound is not described in the literature.

Step B: 13β - ethyl - 18,19 - dinor - testosterone.—At a temperature of —70° C., a solution of 0.45 gm. of optically active 3 - methoxy - 13β - ethyl - Δ$^{1,3,5(10),8}$-gona - tetraene - 17 - one in 33 cc. of tetrahydrofuran and 0.3 cc. of ethanol were added to 90 cc. of liquid ammonia. In the space of 3 hours and 30 minutes, 0.36 gm. of lithium in small pieces and 3 cc. of ethanol in fractions of 0.3 cc. each were added, followed by the addition of 6 cc. of ethanol and 30 cc. of water. Next, the ammonia was removed. The reaction mixture was taken up in methylene chloride, washed with water and distilled under vacuum. The residue was taken up in 30 cc. of methanol and 6 cc. of concentrated hydrochloric acid and heated at reflux for 25 minutes. Thereafter the mixture was diluted with water and extracted with methylene chloride. The extracts were washed and distilled to dryness. Thereafter, the residue was purified by chromatography, obtaining the dextrorotatory 13β-ethyl-18,19-dinor-testosterone.

This product was identical to a sample prepared according to a different method.

EXAMPLE 4

Preparation of 3-methoxy-7α-methyl-Δ$^{1,3,5(10),8,14}$-estrapentaene-17-one

Step A: Preparation of the magnesium reactant.—Under an atmosphere of argon, and within the space of 30 minutes at a temperature of 25° C., a solution of 3 gm. of 1 - bromo - 2α - methyl - 3 - (m - methoxyphenyl)-propane, with a specific rotation [α]$_D^{20}$=—35° (c.=1% in ethanol), in 14 cc. of tetrahydrofuran was added to 320 mg. of magnesium shavings. The mixture was agitated for 2 hours, and a solution of 2α-methyl-3-(m-methoxyphenyl)-propyl magnesium bromide was obtained, titrating 0.5 mol/liter.

Step B: Condensation of 2α - methyl - 3 - (m - methoxyphenyl)-propyl magnesium bromide with the levorotatory lactone of 3 - (1' - methyl - 2',2' - ethylenedioxy - 5' - hydroxy - 4' - cyclopentenyl) - propionic acid.—At a temperature of —70° C. and within the space of 30 minutes, 14 cc. of the solution of the magnesium reactant, obtained in Step A, were added to 970 mg. of the levorotatory lactone of 3 - (1' - methyl - 2',2' - ethylenedioxy - 5'-hydroxy - 4' - cyclopentenyl) - propionic acid (obtained in Step E in Example 1) in solution in 12 cc. of tetrahydrofuran and 3 cc. of toluene. The mixture was agitated for 3 hours at —70° C., then the temperature was raised to —20° C. and the reaction mixture was maintained at this temperature for 1 hour and 30 minutes. Thereafter, the reaction mixture was cooled at —60° C. and the excess of the magnesium reactant was destroyed by an addition of ammonium sulfate. Next, the reaction mixture was extracted with ether and the oil obtained was purified by chromatography through silica gel. Thus, 200 mg. of product were obtained.

Infra-red spectra: absorptions at 1,730 cm.$^{-1}$ and 1,710 cm.$^{-1}$.

Ultra-violet spectra: ε=8,160 at 218 mμ; ε=2,180 at 272–273mμ; ε=1,950 at 279–280 mμ.

Step C: Cyclization.—0.5 cc. of concentrated sulfuric acid (66° Bé.) was added to 50 mg. of the product obtained in Step B. The mixture was agitated for 1 hour and then was poured into a water-ice-sodium bicarbonate mixture. The reaction mixture was washed with water and evaporated to dryness under vacuum. Thus, 34 mg. of 3-methoxy - 7α - methyl - Δ$^{1,3,5(10),8,14}$ - estrapentaene - 17-one were obtained.

Ultra-violet spectra: absorption at 314 mμ.

In the same manner, but starting with 1 - bromo - 2β-methyl - 3 - (m - methoxyphenyl) - propane, with a specific rotation [α]$_D^{20}$=+35° (c.=1% in ethanol), the 3 - methoxy - 7β - methyl - Δ$^{1,3,5(10),8,14}$ - estrapentaene-17-one was obtained.

The preceding specific embodiments are illustrative of the practice of the invention. It is to be understood, however, that other expedients known to those skilled in the art may be employed without departing from the spirit of the invention.

We claim:
1. A process for the preparation of an optically active 13-alkyl gonapentaene of the formula

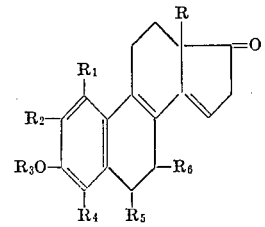

wherein R is an alkyl having from 1 to 3 carbon atoms, $R_1$, $R_2$ and $R_4$ are substituents selected from the group consisting of hydrogen, lower alkyl and lower alkoxy, $R_3$ is lower alkyl and $R_5$ and $R_6$ are substituents selected from the group consisting of hydrogen, α-lower alkyl and β-lower alkyl, which comprises the steps of
  (a) condensing a cyclopentane-1,3-dione of the formula

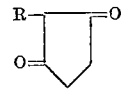

wherein R has the above-noted meanings, with a vinyl compound of the formula

CH$_2$=CH—Y wherein Y is a substituent selected from the group consisting of —COO— lower alkyl and —C≡N, in an anhydrous medium,
  (b) ketalizing the resultant cyclopentylpropionyl compound of the formula

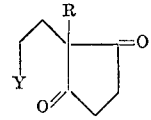

wherein R and Y have the above-noted meanings by the action of a ketalizing agent selected from the group consisting of lower alkylene glycols and dioxolanes, where the lower alkylene has from 2 to 4 carbon atoms, under acid ketalizing conditions,
  (c) saponifying the resultant d,l-ketal of the formula

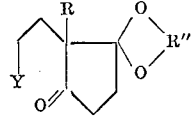

wherein R and Y have the above-noted meanings and R″ represents a lower alkylene having 2 to 4 carbon atoms by the action of an aqueous alkaline medium,
  (d) resolving the resultant d-l-cyclopentylpropionic acid of the formula

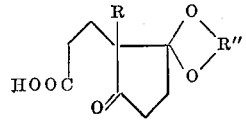

wherein R and R'' have the above-noted meanings into its optical antipodes by the action of an optically active base, (e) lactonizing the resultant optically-active isomer of cyclopentyl-propionic acid of the formula

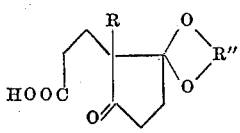

wherein R and R'' have the above-noted meanings by the action of an anhydride of a lower alkanoic acid, (f) condensing the resultant optically active lactone of 3-(1'-R-2'-X' - 5' - hydroxy-4'-cyclopententy)- propionic acid where R has the above-noted meanings and X' is

wherein R'' has the above-noted meanings with a phenylpropyl magnesium halide of the formula

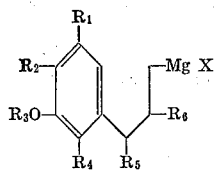

wherein $R_1$, $R_2$, $R_3$, $R_4$, $R_5$ and $R_6$ have the above-noted meanings and X represents a halide selected from the group consisting of bromide, chloride and iodide, in the presence of an ether solvent under Grignard condensation conditions, treating, the resultant condensation product with an alkali metal base, (g) cyclizing and hydrolyzing the resultant optically active secogonatetraene of the formula

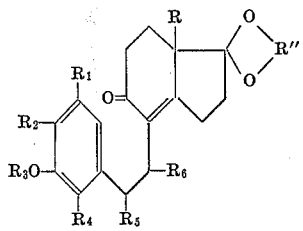

wherein R, $R_1$, $R_2$, $R_3$, $R_4$, $R_5$, $R_6$ and R'' have the above-noted meanings, by the action of a strong acid dehydrating agent, and (h) recovering said optically active 13-alkylgonapentaene.

2. The process of claim 1, step (a), wherein said vinyl compound is a lower alkyl acrylate.

3. The process of claim 1, step (a), wherein said vinyl compound is acrylonitrile.

4. The process of claim 1, step (a), wherein said anhydrous alkaline medium is a tertiary amine in an anhydrous organic solvent.

5. The process of claim 4 wherein said tertiary amine in an anhydrous organic solvent is triethylamine in ethyl acetate.

6. The process of claim 1, step (b), where said ketalizing agent in ketalizing conditions is methylethyldioxolane in ethylene glycol in the presence of an acid catalyst.

7. The process of claim 6 wherein said acid catalyst is selected from the group consisting of p-toluene sulfonic acid and methyl sulfonic acid.

8. The process of claim 1, step (c), wherein said aqueous alkaline medium is an aqueous alkali metal hydroxide.

9. The process of claim 1, step (d), wherein said optically active base is selected from the group consisting of D(—)-threo-(1-p.-nitrophenyl)-2-N,N-dimethylamino-propane-1,3-diol, L(+)-threo-(1-p.-nitrophenyl)-2 - N,N-dimethylamino-propane-1,3-diol, cinchonine, yohimbine 1-nor-adrenaline, quinine and 1-ephedrine.

10. The process of claim 1, step (e), wherein said lower alkanoic acid anhydride is in the presence of an alkali metal salt of a lower alkanoic acid.

11. The process of claim 10 wherein said lower alkanoic acid anhydride in the presence of an alkali metal salt of a lower alkanoic acid is acetic acid anhydride in the presence of sodium acetate.

12. The process of claim 1, step (f), wherein said alkaline medium is an alkali metal hydroxide in a lower alkanol.

13. The process of claim 12 wherein said alkali metal hydroxide in a lower alkanol is methanolic potassium hydroxide.

14. The process of claim 1, step (g), wherein said strong acid dehydrating agent is selected from the group consisting of sulfuric acid, hydrochloric acid, phosphoric acid and organic sulfonic acids.

15. The process of claim 1, step (g), wherein said strong acid dehydrating agent is a mixture of phosphoric acid and phosphoric acid anhydride and the reaction is conducted at a temperature of about 70° C.

16. The process of claim 1 wherein an optically active 13β-alkyl gonapentaene is produced comprising in steps (e), (f), (g) and (h), (e) lactonizing the resultant natural configuration isomer of cyclopentyl-propionic acid of the formula

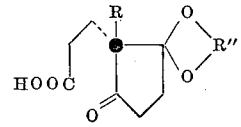

wherein R and R'' have the above-noted meanings, by the action of an anhydride of a lower alkanoic acid (f) condensing the resultant optically active lactone of the formula

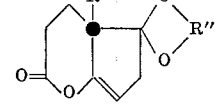

wherein R and R'' have the above-noted meaning with a phenyl-propyl magnesium halide of the formula

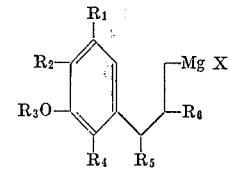

wherein $R_1$, $R_2$, $R_3$, $R_4$, $R_5$ and $R_6$ have the above noted meanings and X represents a halide selected from the group consisting of bromide, chloride and iodide, in the presence of an ether solvent, reacting the resultant condensation product in an alkaline medium, (g) cyclizing the resultant optically active seco-gonatetraene of the formula

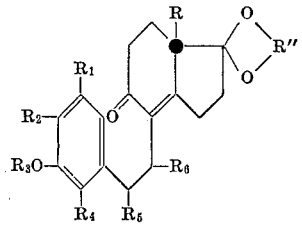

wherein R, $R_1$, $R_2$, $R_3$, $R_4$, $R_5$, $R_6$ and R'' have the above-noted meanings, by the action of a strong acid dehydrating agent, and (h) recovering said optically active 13β-alkyl gonapentaene.

17. The process of claim 16, step (d), wherein said optically active base is selected from the group consisting of cinchonine, D(—)-threo-(1-p-nitrophenyl)-2-N,N-dimethylamine-propane-1,3-diol and 1-nor-adrenaline.

18. The process of claim 1, step (d), wherein the undesired optically active isomer of cyclopentyl-propionic acid of the formula

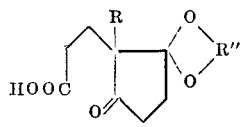

wherein R and R'' have the above-noted meanings is recovered, treated with an aqueous acid to cleave the ketal function and to racemize, the resultant cyclopentyl-propionic acid of the formula

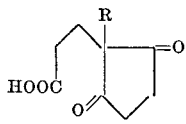

wherein R has the above-noted meaning, is ketalized by the action of a ketalizing agent selected from the group consisting of lower alkylene glycols and dioxolanes, where the lower alkylene has from 2 to 4 carbon atoms, under acid ketalizing conditions, is saponified by the action of an aqueous alkali metal hydroxide, and the resultant d,l-cyclopentyl-propionic acid of the formula

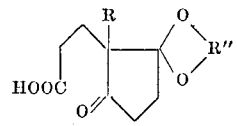

wherein R and R'' have the above-noted meanings is recovered and processed in step (d).

19. The process of claim 1, step (f), wherein the said reaction of the resultant condensation product in an alkaline medium is omitted and said resultant condensation product is cyclized according to step (g).

No references cited.

HENRY A. FRENCH, Primary Examiner

U.S. Cl. X.R.

260—338, 340.3, 340.7, 340.9, 397.4, 397.5, 464, 488, 999